United States Patent [19]
Dutton

[11] 3,930,418
[45] Jan. 6, 1976

[54] POWER TRANSMISSION BELT, REINFORCEMENT AND PROCESS

[75] Inventor: Roger W. Dutton, Milliken, Colo.

[73] Assignee: The Gates Rubber Company, Denver, Colo.

[22] Filed: Jan. 13, 1975

[21] Appl. No.: 540,787

[52] U.S. Cl. .................................. 74/234; 156/139
[51] Int. Cl.² .................... F16G 5/00; B29H 7/22
[58] Field of Search ..................... 156/139; 74/234

[56] References Cited
UNITED STATES PATENTS

| 3,855,870 | 12/1974 | Schnackenberg | 74/234 |
| 3,863,516 | 2/1975 | Fisher et al. | 74/233 |

Primary Examiner—Leonard H. Gerin
Attorney, Agent, or Firm—H. W. Oberg, Jr.; Raymond Fink; Curtis H. Castleman, Jr.

[57] ABSTRACT

A power transmission belt with a tensile section including spirally wound cord bundles of preferably multiple strands of heat shrinkable staple fibers adhesively bonded to each other with portions of the fibers heat shrunk from a slackened to a partially tensioned condition.

5 Claims, 4 Drawing Figures

POWER TRANSMISSION BELT, REINFORCEMENT AND PROCESS

BACKGROUND OF THE INVENTION

The invention relates to power transmission belts, but more particularly, the invention relates to an endless tensile member for power transmission belts.

Textile cords have been used as a tensile member in power transmission belts. Cord bundles for early belts were spun or twisted from staple fibers such as cotton. The tensile strength of such cord bundles is greatly influenced by the frictional forces achieved by twisting the staple fibers together. In many cases, the cord bundles with a greater tensile strength also had longer staple fiber lengths. The prickly ends of the fibers extending from the cord bundles formed a mechanical bond with the polymeric material of the belt which improved the tension carrying capacity of the cord by increasing the force at which the fibers would slip relative to each other.

The load carrying capacity of power transmission belts was greatly improved with the advent of cord bundles made from synthetic yarns of continuous multi-filaments. It was and currently is theorized that improved belt performance results from the substitution of staple fibers with filaments that extend continuously throughout the length of the belt to substantially eliminate slippage between filaments forming the cord bundle.

While the multi-filament synthetics greatly improved the load carrying performance of a power transmission belt, the early synthetics introduced some problems. Synthetic materials such as rayon were produced in multi-filament fashion and then purposely chopped, combed, oriented and twisted into a synthetic staple cord bundle. The fibers of this synthetic staple were purposely made longer to reduce slip between the twisted fibers. Although the twisted staple cord bundle did not have the tensile strength of its corresponding multi-filament counterpart, belts produced with such cord bundles were smoother running because of a reduced cord modulus.

For example, ten belts with a staple rayon cord bundle tensile member and ten belts with a multi-filament rayon cord bundle tensile member were built and tested. Except for the tensile members, the belts had substantially the same constructions. In accelerated tests, the belts with the multi-filament rayon tensile member had average lives of 195 hours whereas the belts with the staple rayon tensile member had average lives of 48 hours.

Newer synthetic fibers such as nylon and polyester have a more satisfactory modulus which eliminates the need for producing staple cords for belts where shock loading is a problem. The new synthetic fibers lead the way for producing belts of even higher load carrying capacity than was formerly achieved. Most power transmission belts presently produced use cord bundles of the continuous multi-filament type.

U.S. Pat. No. 3,855,870 to Schnackenberg discloses a cord bundle, a combination of continuous multi-filament and pseudo staple fibers for use with power transmission belts. The cord is produced by disassociating a plurality of end portions from a multi-filament cord bundle. Improved belt performance is believed to result from improved mechanical bonding of the tensile member with the polymeric material of the power transmission belt. Nevertheless, it is generally believed that a multi-filament cord bundle with a predominate number of continuous filaments is better as a tensile member than a cord bundle of twisted staple fibers.

The present art also uses adhesives and chemical agents to further enhance bonding between the polymeric material of a belt and the tensile member of spirally wound cord. Thus, the present belt art takes advantage of continuous multi-filament cord bundles and chemical agents or adhesives to effect power transmission belts of high performance.

Perhaps one reason why belts with staple fiber cord bundles do not have the equivalent load carrying capacity as belts having a multi-filament cord bundle, is that the individual staple fibers are stressed past their yield point when power is transmitted. For example, assume that two such staple fibers are twisted together. If the fibers are tensioned, each end of the fiber will be unstressed while the center portions of the fiber are stressed. The tensile load stresses must be less than that force which is required to separate adjacently twisted fibers.

Next assume that two staple fibers in pseudo being parallel and twisted together at their end portions where the center portion of one fiber is taut while the center portion of the fiber is slackened. When a tensile load is applied to the fibers, the taut fiber will be over-stressed while the slackened fiber will have zero stresses. If this tension load is that which is required to transmit power with a V-belt, the taut fiber may become over-stressed and break. A cord bundle of twisted, staple fibers will have a multitude of fibers in such an arrangement.

When staple fibers are adhered together such as with polymeric material of a power transmission belt, they do not easily slip relative to one another to give each fiber its proportional share of a tensile load. The originally taut fibers may be relatively over-stressed so that slack will be taken from the slackened staple fibers so they can share in transmitting a load. Thus, some fibers will be highly stressed whereas other staple fibers of the cord bundle will be lowly stressed.

Belt life may be increased in some drives by lowering the modulus of the tensile member. Generally, the type of drive where increased belt life may be accomplished is those drives where small diameter sheaves are used. An example of such a drive is a front end automotive drive. Belt life may be increased by lowering the modulus provided that the reduction in stresses achieved by lowering the modulus is greater than the strength loss resulting from the change to a lower modulus material.

A reduction in modulus may be achieved in generally two ways. First, a lower modulus material may be used for the multi-filament cord bundle. Any gain in belt life because of a lower modulus may be predicted.

Secondly, a staple cord bundle may be made from a synthetic fiber of substantially the same modulus. When this is done the modulus of the cord bundles is reduced. Heretofore, the loss in modulus from use of staple fibers has always been greater than the reduction in stress concentrations that may have been gained. It is believed that this is because of the parallel filament loading concept discussed above. Thus, prior art power transmission belts with staple fibers have not had as good of belt life as power transmission belts built with multi-filaments of the same material.

SUMMARY OF THE INVENTION

In accordance with the invention, improved power transmission belts are provided which have a tensile member of spirally wound cord bundles of synthetic staple fibers. The fibers are twisted together to form strands and the strands are twisted together to form a cord bundle. The cord bundles are treated with an adhesive to bond the fibers together where some of the fibers may be taut while other fibers are slackened. The cord bundles are incorporated in power transmission belt bodies in known fashion and the fibers are thermally shrunk to tension portions of previously unslackened fibers. The staple filament cord bundle combines with first and second layers of a power transmission belt to produce a belt having unexpected improvement in performance when compared to a multi-filament cord bundle belt.

An object of the invention is to produce an endless power transmission belt having superior performance qualities with materials heretofore used to make belts of characteristic lower performance capability.

Another object of the invention is to define a new belt construction that exhibits superior belt performance when compared to belt structures of similar combinations using multi-filament cord bundles.

Still another object of the invention is to provide a method for producing tensile members for belts which compliment current belt molding techniques.

An advantage of the invention is that a smooth running belt with less deviation in predicted performance is achieved.

Another advantage of the invention is that belts may be made using more economically advantageous techniques.

Another advantage of the invention is that manufacturing tolerances need not be as critically controlled or adjusted for some molding and curing processes.

These and other objects or advantages of the invention will be apparent after review of the drawings and description thereof wherein.

DESCRIPTION OF PREFERRED EMBODIMENTS

Multi-filament synthetic yarns of continuous lengths are typically twisted in S or Z fashion to define individual strands. The strands may be twisted together in S or Z fashion to define what is known in the art as a multi-filament cord bundle that is suitable to use as a tensile section in power transmission belts such as flat belts, positive drive belts, or V-belts. The same multi-filament yarn may be chopped to desired lengths to form synthetic staple fibers. The chopped fibers are then combed, oriented, and twisted into strands and the strands twisted into cord bundles for use as a tensile member in power transmission belts. This invention is directed to cord bundles comprised of synthetic staple filaments.

Figure 5:
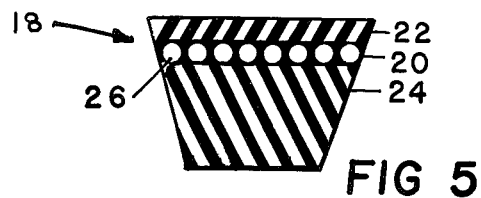
FIG. 5 is a cross-sectional view of a power transmission belt.
Figure 1:
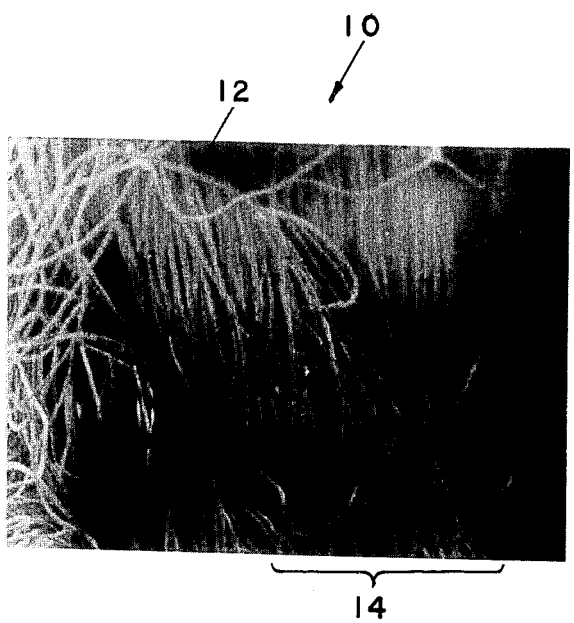
FIG. 1 is a photomicrograph of an untreated tensile cord bundle of twisted staple fibers.

Referring to FIG. 1, a cord bundle 10 is comprised of staple fibers 12 of synthetic multi-filament yarn which has a negative coefficient of thermal expansion such as polyester. The fibers are twisted together to form strands 14, and the strands are twisted together to form the cord bundle. Any numbers of fibers and strands may be used to form the cord bundle or required denier and a combination of twisting is used to achieve a desired effect.

Figure 2:
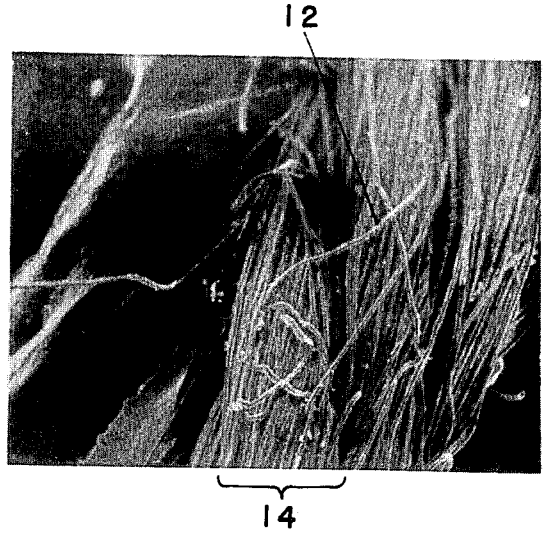
FIG. 2 is a photomicrograph (40x) of a cord bundle similar to FIG. 1 but has been treated with a chemical agent.
Figure 3:
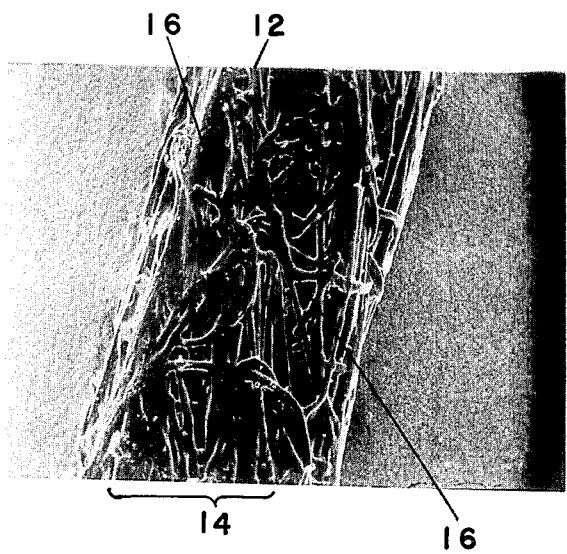
FIG. 3 is a photomicrograph (40x) showing a cord bundle similar to FIG. 2 but which has been treated with an adhesive.
Figure 4:
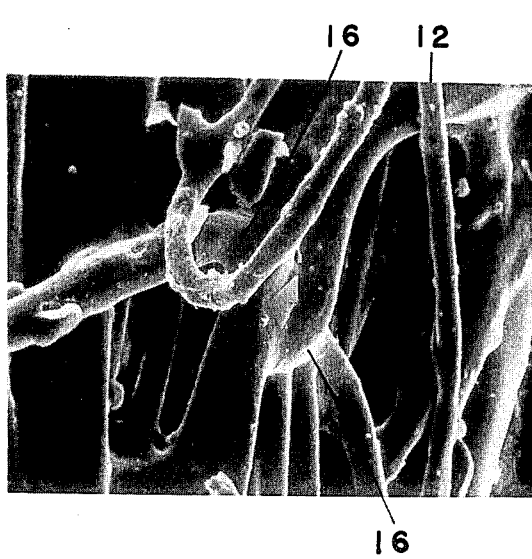
FIG. 4 is a photomicrograph (200x) showing an enlarged portion of FIG. 3.

The cord bundle 10 is treated with an adhesive, FIGS. 3, 4, to bond portions of the fibers to portions of each other 16. Preferably, the cord bundle is first treated with a penetrating aquaphobic chemical agent solution, FIG. 2, such as polyisocyanates and then treated with a water soluble adhesive such as rescorcinol formaldehyde compounded latex. The aquaphobic agent penetrates the loose cord bundle 10 wetting the fibers 12 which aids in distributing the water soluble adhesive evenly to form a thin film that substantially encapsulates the individual fibers. The openness of the twisted cord bundle permits the aquaphobic solution and adhesive to penetrate deep into the cord bundle to encapsulate the fibers. The adhesive is dried while the cord bundle is simultaneously tensioned which aids in further orienting the fibers. As shown in FIG. 2, the fibers are bonded together forming a smooth and continuous web-like matrix. The cord bundles so treated are suitable for fabricating into a tensile member for a power transmission belt. The "openness" and complete penetration of the adhesive into the cord bundle permits the cord bundle to operate as more of an integral member in a power transmission belt than would be achievable with multi-filament yarn. The photomicrograph of FIG. 4 clearly shows fibers adhesively bonded and interlocked to portions of each other 16 with the dried encapsulating adhesive.

Advantageously, the penetration of a chemical agent and adhesive is much more significant than that which is achievable with a multi-filament yarn where adjacent filaments are located close to each other. Tensioning multi-filament yarn pulls the filaments in close contact with each other forming a filament to filament seal that inhibits complete penetration and encapsulation of the continuous filaments with a solution. Only the filaments on the outer periphery of the multi-filament yarn may be effectively covered with the solution.

The drying and tensioning process longitudinally aligns a plurality of fibers within the bundles. This is clearly seen by comparing FIGS. 1 and 3. Tensioning the cord bundle takes the slack out of many fibers so that they may share in carrying a tensile load. However, the adhesively treated cord still has a number of fibers that are slightly slackened between points where they are adhesively bonded to adjacent fibers. Many of the individual fibers are not completely aligned and unslackened until after they are fabricated to become a tensile member in a power transmission belt.

Power transmission belts are fabricated by known processes. A power transmission belt 18 typically includes first 22 and second layers 24 of heat curable polymeric material between which is interposed a tensile member 20 formed by one or more spirally wound cord bundles 26 that are produced in accordance with the invention. Other reinforcements such as textile cross-cords or fibers may be included in the first and second layers in known fashion. However, the predominate material from a physical and usually a volume standpoint may be natural or synthetic rubbers or blends thereof, synthetic rubbers such as polyurethane, or suitable heat-setting thermal plastic elastomers preferably in the form of a polyester elastomer. Typically, these polymers, especially the rubbers, are heat cured at a temperature which causes some materials having a negative coefficient of thermal expansion to shrink. For example, polyester staple filaments will shrink when subjected to a temperature generally above 140° F. On the other hand, most rubbers are typically cured at temperatures ranging from 250 to 400 degrees F. During curing, rubber becomes initially plastic and moldable into desired configurations prior to becoming completely polymerized to a harder condition. While the polymer, preferably a rubber, is in its plastic condition, the cord is also heated. Slackened portions between the attached portions of the fibers are able to shrink to take up slack. The plastic state of the elastomer permits the shrinking to take place. Once the rubber has been held at a high enough temperature for a sufficient time period, it is cured which further aids in holding the fibers in their oriented position.

When in use, the lower modulus cord bundle of the invention has unexpectedly demonstrated improved belt performance over similar belts built using cord bundles of continuous multi-filament polyester. Eight belts having a multi-filament tensile member and eight belts with a staple fiber tensile member in accordance with the invention were built. Except for the tensile member, the belts were substantially of the same construction and were tested under substantially the same conditions. In accelerated tests, belts using multi-filament polyester cord bundles as a tensile member had average belt lives of 110 hours whereas belts built with staple polyester cord bundles treated and processed in accordance with the invention had average belt lives of 260 hours. The test conditions were selected for representing the front end drive on an automobile where small diameter pulleys are used.

It is theorized that the improved belt performance results from taking the slack out of staple filaments between those portions of the filaments which are adhesively bonded together. This permits each filament to take more of its share of the representative load without failure. Also, the staple polyester cord bundle has a lower modulus than that of the multi-filament cord bundle which in combination with the load carrying capacity of the adhesively bonded filaments gives improved belt performance.

Generally speaking, there are three main stresses which are carried in a tensile member of a V-power transmission belt. The prevalent stresses are: those stresses concentrated at the edge cord of the V-belt; those stresses required for carrying the tensile load to transmit the power; and those stresses resulting from bending around a sheave. A lower modulus material allows the stress concentration at the edges to be more evenly distributed to the inner cords of the belt. The lower modulus material also reduces the prevalent bending stresses in accordance with Hooke's law which states that stress is proportional to strain. A suitable cord bundle modulus is achieved by the fiber bonding and unslackening as discussed above. The loss in stress concentration at the edges plus the loss in bending stresses for the belts produced in accordance with the invention is greater than the resultant modulus loss from going from a multi-filament tensile member to a staple tensile member.

The foregoing detailed description is presented for the purpose of illustration only and is not intended to limit the scope of the invention which is to be determined from the appended claims.

What is claimed is:

1. In a power transmission belt of the type having a spirally wound tensile member interpositioned between layers of a heat curable, predominately polymeric body, the improvement comprising:
   at least one cord bundle of twisted staple fibers having a negative coefficient of expansion, a plurality of which are adhesively bonded to portions of each other, a plurality of portions of the fibers between the adhesively bonded portions arranged to generally unslackened positions, and
   wherein the cord bundle defines the tensile member.

2. A belt as set forth in claim 1 comprising an adhesive encapsulating a predominant portion of the staple fibers.

3. A belt as set forth in claim 1 wherein the staple fibers are polyester.

4. A cord bundle adaptable for use with a power transmission belt comprising:
   a plurality of generally longitudinally oriented staple fibers of polyester having a negative coefficient of expansion, a plurality of which are twisted and bonded with an adhesive to portions of each other, a plurality of portions of the fibers between the adhesively bonded portions arranged to generally unslackened positions.

5. A method for making power transmission belts having steps of fabricating a first layer of predominately elastomeric, heat curable material, spirally winding at least one cord bundle over the first layer forming a tensile member fabricating a second layer of predominately elastomeric material over the tensile member, and simultaneously curing and molding the elastomeric material, wherein the improvement comprises the steps of:
   treating a cord bundle of twisted staple fibers having a negative coefficient of expansion with an aquaphobic solution;
   successively treating the cord bundle with a water soluble adhesive and thereby bonding portions of the fibers to portions of each other;
   simultaneously shrinking and unslackening a plurality of portions of the fibers between the adhesively bonded portions while curing the elastomeric material.

* * * * *